United States Patent [19]

White

[11] Patent Number: 5,329,883
[45] Date of Patent: Jul. 19, 1994

[54] RELEASABLE HITCH

[76] Inventor: James R. White, Box 22, Rexford, Mont. 59930

[21] Appl. No.: 181,831

[22] Filed: Jan. 18, 1994

[51] Int. Cl.$^5$ .............................................. A01K 1/06
[52] U.S. Cl. ..................................................... 119/779
[58] Field of Search ............... 119/769, 777, 778, 779; 403/330, 325, 327

[56]   References Cited
   U.S. PATENT DOCUMENTS

| | | | |
|---|---|---|---|
| 384,106 | 6/1888 | Whalen | 119/778 |
| 544,568 | 8/1895 | Desailly et al. | |
| 602,569 | 4/1898 | Turner | |
| 675,453 | 6/1901 | Storgess | |
| 1,228,360 | 5/1917 | Franchini et al. | 119/778 |
| 2,452,796 | 11/1948 | Skibsted | 280/150 |
| 4,186,690 | 2/1980 | Seiler | 119/110 |

FOREIGN PATENT DOCUMENTS 2259532  8/1975  France ................... 119/777

*Primary Examiner*—Thomas Price
*Attorney, Agent, or Firm*—Rhodes & Ascolillo

[57]   ABSTRACT

A releasable hitch having a T-shaped body portion including a horizontal member perpendicularly joined to a vertical member is disclosed. The vertical member has opposing side walls, one of which is bisected by an upwardly sloping channel disposed above the horizontal member. The vertical member additionally comprises a horizontally disposed bore disposed the horizontal member. A bolt is fitted for rotational and longitudinal motion within the horizontally disposed bore. The bolt includes a cylindrical shaft having an externally threaded portion at one of its ends and two semicircular flanges, defining a slot therebetween, at the other end thereof. A C-shaped hook is pivotally secured to the semicircular flanges and has a free end adapted for engagement with the lateral channel. A spring, coiled about the cylindrical shaft and acting upon the bolt, normally biases the free end of the hook within the channel. A nut threadably secured to the externally threaded portion of the cylindrical shaft is provided for adjusting the tensile force required to extract the free end of the hook from the channel.

7 Claims, 2 Drawing Sheets

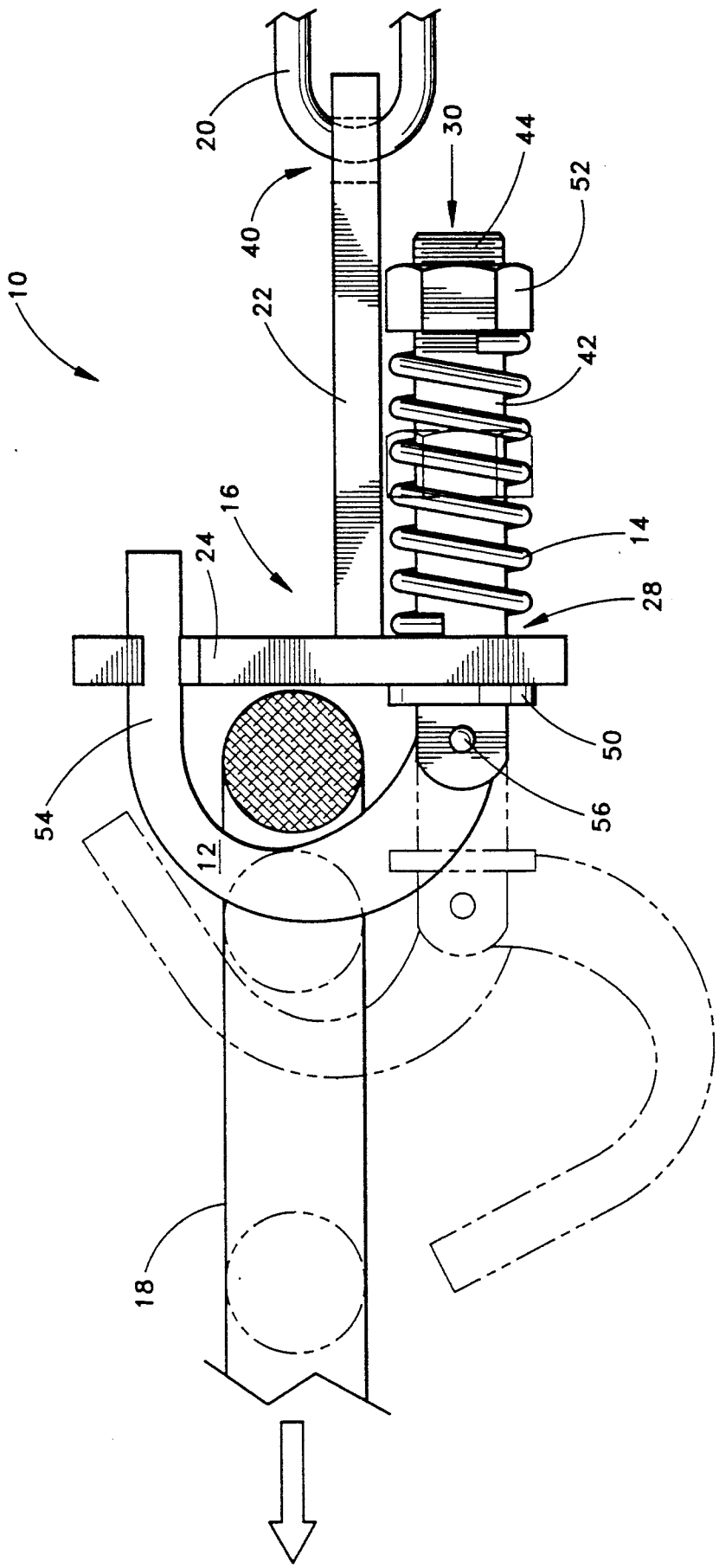

RELEASABLE HITCH

BACKGROUND OF THE INVENTION

1. Field of the Invention

The present invention relates generally to a fastening device having a safety release feature for use in hitching pack animals together.

2. Description of the Related Art

Devices including means for automatically releasing two bodies joined by a cord have been proposed in prior patents. While commonly including spring-biased hooks, many of these devices are of complex and costly construction. Further, they are often difficult to reset, requiring a high degree of manual dexterity or strength to position the hooks for subsequent release. By way of example, those devices known to the inventor are described below.

U.S. Pat. No. 544,568, issued Aug. 13, 1895 to Louis J. DeSailly et al, provides a safety hook for use in stables. The hook itself pivots upon the end of a bolt disposed within a cylindrical body. A series of alternatingly positioned steel cups fitted upon the bolt biases the hook against the body in its unreleased position. Upon the application of a sufficient tensile force, the steel cups are compressed and somewhat flattened, thereby allowing the upper end of the hook to be released from a catch extending outwardly from the body.

U.S. Pat. No. 602,569, issued Apr. 19, 1898 to Donald L. Turner, shows a releasing device comprising a pivoting clutch mechanism releasably secured within a tubular housing. The clutch mechanism includes two cylindrical jaws adapted to engage a ball disposed at the end of a spring biased eyebolt. Two of the housing's tubular elements are threadably connected allowing the spring tension upon the eyebolt to be varied. A set screw permits the spring tension to be fixed and prevented from varying. Thus, upon application of a force sufficient to overcome the spring's pull, the clutch may be withdrawn from the housing and the device separated into two component parts.

U.S. Pat. No. 675,453, issued Jun. 4, 1901 to George F. Sturgess, describes a coupling device for use with bicycles. The device includes a tether or cord for transmitting tensile force from one bicycle to another for towing purposes. A C-shaped spring clip is provided for securing one end of the tether to a bicycle. When a sufficient tensile force is applied thereto, the spring clip will automatically release from its supporting surface preventing harm to the riders.

U.S. Pat. No. 2,452,796, issued Nov. 2, 1948 to Ole M. Skibsted, discloses self-releasing rope hitch used when towing a plow behind a tractor. The hitch includes a circular link retained against a metal strap by a spring biased jaw member. The biasing means for the jaw member include a spring disposed upon a threaded bolt. Rotation of a nut at the end of the bolt adjusts the force imparted by the spring against the jaw member.

U.S. Pat. No. 4,186,690, issued Feb. 5, 1980 to John J. Seiler, teaches the use of a safety clip in an animal grooming tethering device. The clip includes two generally resilient parallel arms connected to one another at one end and having their free ends bent inwardly toward one another in a V-shaped configuration. A band, slidable on the arms, is provided to adjust the clip to release a tether at a predetermined force.

None of the above inventions, taken either singly or in combination, is seen to describe the instant invention as claimed.

SUMMARY OF THE INVENTION

In many cases, pack animals are still relied upon today for transportation in some areas of the country. These animals, including horses and mules, have proven their sure-footedness on trails that some humans fear to tread. Shear cliffs and deep chasms often border the principal pack animal routes. In these areas, an unintended stumble or fall by a single pack animal often leads to catastrophe.

The use of pack animals as a means of transportation clearly involves a certain amount of risk to life and property. Although injuries are a rare occurrence on pack horse trips, they do happen from time to time. Furthermore, since the animals are usually hitched to one another for purposes of control, the inadvertent fall of a single pack horse can lead to a chain reaction involving other animals to which it is tethered. A need exists, therefore, for a fastening device having a quick release mechanism that permits the separation of two hitched pack horses in an emergency situation such as an unintended stumble or fall.

Accordingly, it is a principal object of the present invention to provide an releasable hitch which will reduce injuries to life and property by enabling the animals to free themselves by their own weight, with the hitch coming open automatically under a predetermined load.

Another object of the present invention is to provide a device for releasing lines, cords, and the like when they are subjected to an undesirable stress.

The present invention achieves the above objects, among others, by providing in one aspect a releasable hitch. The releasable hitch includes a vertical member with opposing side and end walls, one of the side walls being bisected by a lateral channel; the vertical member has a horizontally disposed bore perpendicular to a longitudinal axis of the vertical member. A horizontal member is joined perpendicularly to the vertical member between the top and bottom of the vertical member. There is also a bolt fitted for rotational and longitudinal motion within the horzizontally disposed bore, a C-shaped hook pivotally secured to a first end of the bolt, with the C-shaped hook having a free end adapted for engagement with the lateral channel, and a spring acting upon the bolt to normally bias the free end of the hook within the channel.

Preferably, the bolt further includes a cylindrical shaft having an externally threaded portion at a second end of the bolt and two semicircular flanges, disposed at the first end of the bolt and defining a slot for the receipt of the hook therebetween. Additionally, there is a ring firmly secured about the periphery of the shaft between the externally threaded portion and the semicircular flanges, with the ring having an outer diameter greater than the diameter of the horizontally disposed bore for preventing the passage of the flanges through the horizontally disposed bore. A nut is threadably secured to the externally threaded portion of the bolt for adjustably compressing the spring, with the spring being coiled about the cylindrical shaft and disposed between the nut and the ring so as to resiliently bias the ring against the vertical member.

The horizontal member has a vertically disposed bore perpendicular to a longitudinal axis of the horizontal member therein for the attachment of the releasable hitch to a supporting surface. The lateral channel is disposed above the horizontal member and the horizontally disposed bore is disposed below the horizontal member. Finally, the channel has a length greater than one half of the distance between the opposing side walls of the vertical member, and the channel slopes upwardly from its opening to its closed end.

In another aspect, the invention generally provides a releasable hitch, including a T-shaped body portion having a horizontal member perpendicularly joined to a vertical member between a top and bottom of the vertical member. The vertical member has opposing side and end walls, one of the side walls being bisected by a lateral channel disposed above the horizontal member, with the vertical member additionally including a horizontally disposed bore remote from the lateral channel and disposed below the horizontal member. The channel has a length greater than one half of the distance between the opposing side walls of the vertical member, with the channel sloping upwardly from its opening to its closed end. Additionally, the horizontal member having a vertically disposed bore for the attachment of the releasable hitch to a supporting surface. There is also a bolt fitted for rotational and longitudinal motion within the horizontally disposed bore. The bolt includes a cylindrical shaft having an externally threaded portion at one of its ends and two semicircular flanges, defining a slot, at the other end thereof, and a ring firmly secured about the periphery of the shaft between the externally threaded portion and the semicircular flanges, with the ring having an outer diameter greater than the diameter of the horizontally disposed bore for preventing the entry of the flanges into the horizontally disposed bore. A nut threadably secured to the externally threaded portion of the bolt, and a C-shaped hook is pivotally secured within the slot of the bolt and has a free end adapted for engagement with the lateral channel. Finally, there is a spring acting upon the bolt to normally bias the free end of the hook within the channel, with the spring being coiled about the cylindrical shaft and disposed between the nut and the ring so as to resiliently and adjustably bias the ring against the vertical member.

These and other objects of the present invention will become readily apparent upon further review of the following specification and drawings.

BRIEF DESCRIPTION OF THE DRAWINGS

FIG. 3 is a side elevational view of the hitch, the hook movement shown in broken lines.

Similar reference characters denote corresponding features consistently throughout the attached drawings.

DETAILED DESCRIPTION OF THE PREFERRED EMBODIMENT

Figure 2:
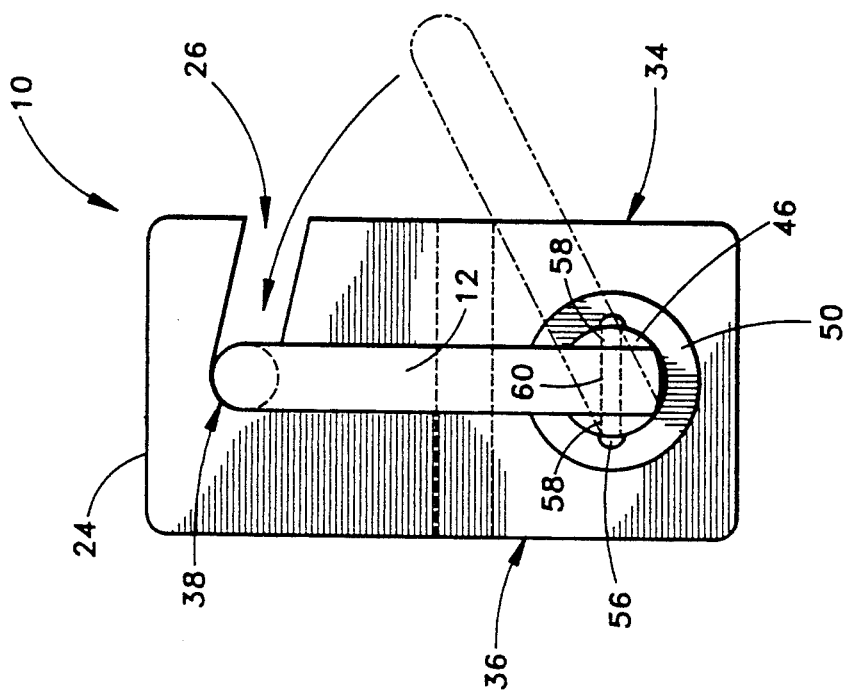
FIG. 2 is an end view of the hitch illustrated in FIG. 1.
Figure 1:
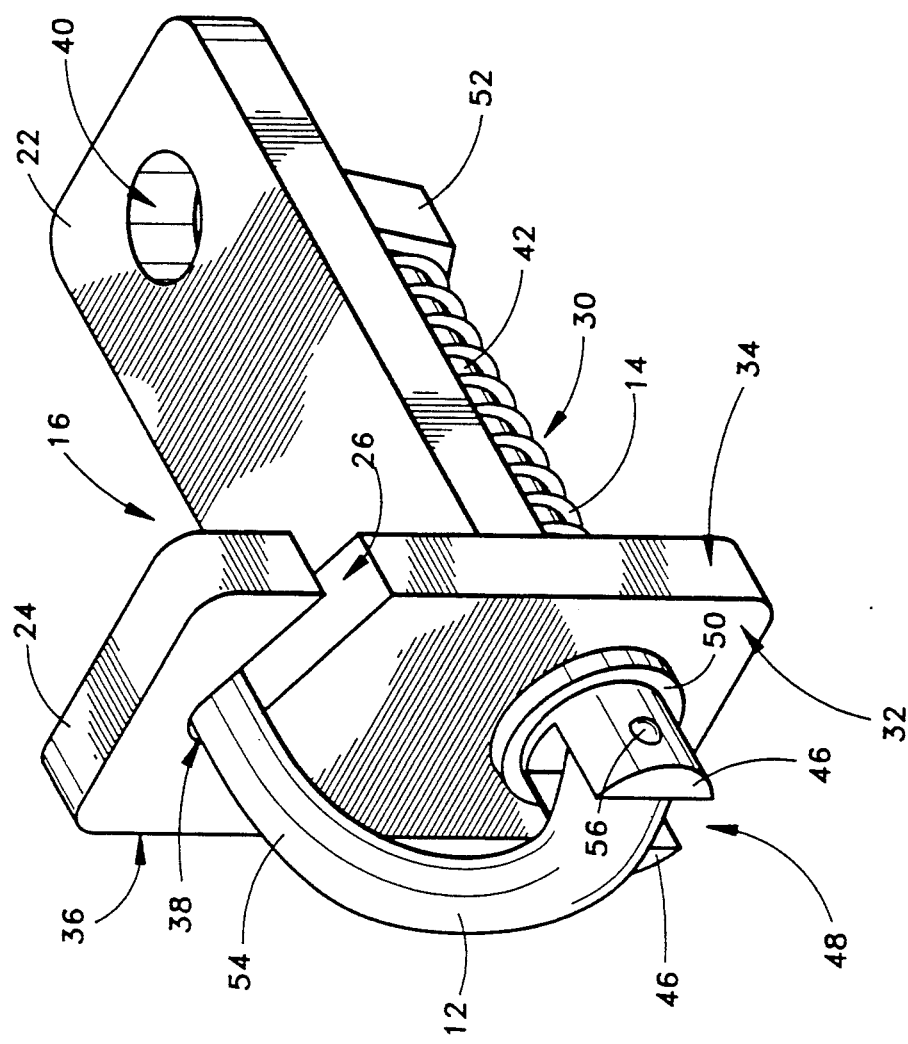
FIG. 1 is a perspective view of a releasable packhorse hitch in accordance with the present invention.

Referring now to the figures, a releasable hitch 10 in accordance with the present invention is illustrated. Broadly, the hitch 10 includes a pivoting hook 12 biased by a spring 14 against a T-shaped body 16. Upon the application of a sufficient tensile force, a cord loop 18 secured by the hook 12 to the body 16 will be automatically released from the grasp of the hook 12 thereby separating the cord loop 18 from the body 16 and its supporting surface represented by link 20, as illustrated by FIG. 3.

The T-shaped body 16 comprises a horizontal member 22 having one of its ends joined perpendicularly to a vertical member 24 approximately midway between the vertical member's upper and lower ends. Both of the members 22 and 24 are substantially rectangular in outline and are formed from a high-strength material such as an alloy of steel. The T-shaped configuration may be imparted to the body 16 by welding, casting, or machining metal stock. Preferably, however, the body 16 is formed by welding two pieces of steel plate having the proper configuration to one another.

The vertical member 24 is provided with two cutouts formed by the removal of steel plate material therefrom during fabrication. Positioned above the junction of members 22 and 24 is a lateral opening or channel 26. The channel 26 is of a narrow and constant width so as to prevent the unintended motion of the hook 12 when seated therein. Positioned below the junction of members 22 and 24, on the other hand, is a horizontal bore 28 for the receipt of a bolt 30 to which hook 12 is pivotally joined. The bore 28 has a longitudinal axis disposed normally to the end wall 32 of the vertical member 24, and midway between side walls 34 and 36, of the vertical member 24. Upon examination of FIG. 2, it will be noted that the channel 26 has a length greater than one half of the distance between the opposing side walls 34 and 36 of the vertical member 24 so as to allow the hook 12 to be vertically disposed therein. Further, the channel 26 is provided with a gradual upward slope from its opening in side wall 34 to its terminus at closed end 38. The slope approximates the arc of a circle having a center point falling upon the longitudinal axis of bore 28 and having a radius substantially equivalent to the height of hook 12.

A portion of the steel plate material is similarly removed from the horizontal member 22 during the fabrication thereof. Positioned at the free end of the horizontal member 22 is a vertically disposed bore 40. The bore 40 provides a means for attaching the hitch 10 to the saddle of a horse (not shown) or other supporting surface through the link 20, shown on FIG. 3.

Movably engaged with the bore 28 in the vertical member 24 is a bolt 30, which is disposed below the free end of the horizontal member 22. The bolt 30 includes a cylindrical shaft 42 having a threaded surface 44. Two opposing semicircular flanges 46, defining a narrow slot 48 therebetween, are provided opposite the threads 44 and projecting from the end wall 32 of the vertical member 24. A circular ring 50 is secured in a fixed position about the shaft 42, between the flanges 46 and the threads 44. The ring 50 has an outer diameter greater than the diameter of the bore 28 so as to prevent the passage of the flanges 46 through the bore 28. The ring 50 is held against the end wall 32 of the vertical member 24 by means of the spring 14. The spring 14 is coiled about, and fitted freely upon, the cylindrical shaft 42 and secured thereto by a tensioning nut 52 on the threaded end of the bolt 30. During use, the spring 14 normally sustains the hook 12 in engagement with the channel 26.

The C-shaped hook 12 is pivotally secured to the bolt 30 and has its free end 54 adapted to engage the channel 26 in vertical member 24. The lower end of the hook 12 is fitted within the slot 48 and is pivotally secured to the flanges 46 by pin 56. The pin 56 passes through axially aligned holes 58 and 60 in the flanges 46 and the hook 12, respectively. The pin 56 may be secured to the flanges 46 by any means known in the art, including the flaring outward of each of its ends, to prevent its inadvertent loss during use.

To use the hitch 10, the horizontal member 22 is secured to a pack animal saddle (not shown) through link 20 inserted into bore 40. The loop 18 of the pack animal's lead rope or cord is then secured within the hook 12 as shown in FIG. 3. Whenever sufficient force is applied to the hook 12, as when a pack animal stumbles or falls, the loop 18 is immediately disengaged, freeing the stricken animal from the companions to which it is tethered. In unfastening, the hook 12 moves laterally away from the vertical member 24, thereby compressing the spring 14, and causing the free end 54 to be withdrawn from the channel 26. Under a continuing load form loop 18, the hook 12 pivots downward on the pin 56, thus releasing the loop 18 from the hook 12, as illustrated in broken lines in FIG. 3.

The automatic unfastening of the hitch 10 is effected by the application of a sufficient tensile force or longitudinal pull on the hook 12 through the channel 26. This tensile force is determined by the force constant of the spring 14 and varies according to the degree that the spring 14 is tensioned by nut 52. By rotating the nut 52, the tensile force required to release the loop 18 from the hook 12 may be varied. As the compressive force applied to the spring 14 by the nut 52 is increased, a corresponding increase in the tensile force or longitudinal pull would be required to extract the hook 12 from channel 26 to free the loop 18.

Finally, resetting the hook 12 to its operative position can be easily accomplished by rotating the free end 54 of the hook 12 into engagement with channel 26. Since the channel 26 opens outwardly from the side wall 34 of the vertical member 24, the rotational engagement may be accomplished by simply turning the hook 12 and bolt 30 about the longitudinal axis of the bolt. Of course, during this procedure there is no need to further compress the spring 14 or lessen the force applied thereto by the nut 52. Thus, even an individual having minimal strength can reset the hook 12 for use with little effort.

It is to be understood that the present invention may be embodied in other specific forms and is not limited to the sole embodiment described above, but encompasses any and all embodiments within the spirit and scope of the following claims. Therefore, the present embodiment must be considered in all respects as illustrative only.

I claim:

1. A releasable hitch, comprising:
   a vertical member with opposing side and end walls, one of said side walls being bisected by a lateral channel, said vertical member additionally comprising a horizontally disposed bore perpendicular to a longitudinal axis of said vertical member;
   a horizontal member joined perpendicularly to said vertical member between the top and bottom of said vertical member;
   a bolt fitted for rotational and longitudinal motion within said horizontally disposed bore;
   a C-shaped hook pivotally secured to a first end of said bolt, said C-shaped hook having a free end adapted for engagement with said lateral channel; and
   a spring acting upon said bolt to normally bias said free end of said hook within said channel.

2. The releasable hitch according to claim 1, wherein said bolt further comprises:
   a cylindrical shaft having an externally threaded portion at a second end of said bolt and two semicircular flanges, disposed at said first end of said bolt and defining a slot for the receipt of said hook therebetween; and
   a ring firmly secured about the periphery of said shaft between said externally threaded portion and said semicircular flanges, said ring having an outer diameter greater than the diameter of said horizontally disposed bore for preventing the passage of said flanges through said horizontally disposed bore.

3. The releasable hitch according to claim 2, further comprising:
   a nut threadably secured to said externally threaded portion of said bolt for adjustably compressing said spring;
   said spring being coiled about said cylindrical shaft and disposed between said nut and said ring so as to resiliently bias said ring against said vertical member.

4. The releasable hitch according to claim 1, wherein said horizontal member has a vertically disposed bore perpendicular to a longitudinal axis of said horizontal member therein for the attachment of said releasable hitch to a supporting surface.

5. The releasable hitch according to claim 4, wherein said lateral channel is disposed above said horizontal member and said horizontally disposed bore is disposed below said horizontal member.

6. The releasable hitch according to claim 1, wherein said channel has a length greater than one half of the distance between said opposing side walls of said vertical member and said channel slopes upwardly from its opening to its closed end.

7. A releasable hitch, comprising:
   a T-shaped body portion having a horizontal member perpendicularly joined to a vertical member between a top and bottom of said vertical member;
   said vertical member having opposing side and end walls, one of said side walls being bisected by a lateral channel disposed above said horizontal member, said vertical member additionally comprising a horizontally disposed bore remote from said lateral channel and disposed below said horizontal member;
   said channel having a length greater than one half of the distance between said opposing side walls of said vertical member and said channel sloping upwardly from its opening to its closed end;
   said horizontal member having a vertically disposed bore for the attachment of said releasable hitch to a supporting surface;
   a bolt fitted for rotational and longitudinal motion within said horizontally disposed bore, said bolt including:
   a cylindrical shaft having an externally threaded portion at one of its ends and two semicircular flanges, defining a slot, at the other end thereof; and
   a ring firmly secured about the periphery of said shaft between said externally threaded portion and said semicircular flanges, said ring having an outer diameter greater than the diameter of said horizontally disposed bore for preventing the entry of said flanges into said horizontally disposed bore;

a nut threadably secured to said externally threaded portion of said bolt;
a C-shaped hook pivotally secured within said slot of said bolt and having a free end adapted for engagement with said lateral channel; and,
a spring acting upon said bolt to normally bias said free end of said hook within said channel, said spring being coiled about said cylindrical shaft and disposed between said nut and said ring so as to resiliently and adjustably bias said ring against said vertical member.

* * * * *